United States Patent [19]

Stedman

[11] 4,123,119
[45] Oct. 31, 1978

[54] TRACK SHOE WITH CLAMPING MEANS

[75] Inventor: Robert N. Stedman, Chillicothe, Ill.

[73] Assignee: Caterpillar Tractor Co., Peoria, Ill.

[21] Appl. No.: 828,004

[22] Filed: Aug. 26, 1977

[51] Int. Cl.² ............................................. B62D 55/28
[52] U.S. Cl. ........................................ 305/39; 305/54
[58] Field of Search ...................... 305/51, 53–55, 305/35 R, 35 EB, 39–50, 60; 301/44 T; 74/247; 152/180, 182, 187, 199

[56] References Cited

U.S. PATENT DOCUMENTS

| | | | |
|---|---|---|---|
| 1,148,518 | 8/1915 | Krupp | 305/11 |
| 1,503,611 | 8/1924 | Springer | 305/51 |
| 1,536,604 | 5/1925 | Bentson | 305/54 |

Primary Examiner—Robert B. Reeves
Assistant Examiner—John P. Shannon

Attorney, Agent, or Firm—Phillips, Moore, Weissenberger, Lempio & Majestic

[57] ABSTRACT

An endless track assembly comprises a plurality of track shoes pivotally interconnected by a link assembly secured thereto. The link assembly comprises a plurality of links with each track shoe being releasably secured to each pair of laterally spaced links by a plurality of bolts. Each track shoe comprises a base plate disposed on each pair of links, a track plate disposed on the base plate and at least one clamping plate straddling the track plate. The bolts sequentially extend through the clamping plate, the track plate, the base plate and each pair of the links for releasably securing the track shoe to the link assembly. In one embodiment of the invention, the clamping plate is mounted on a pair of spacer blocks whereas in a second embodiment the clamping plate is mounted directly on the base plate.

25 Claims, 3 Drawing Figures

U.S. Patent        Oct. 31, 1978        4,123,119
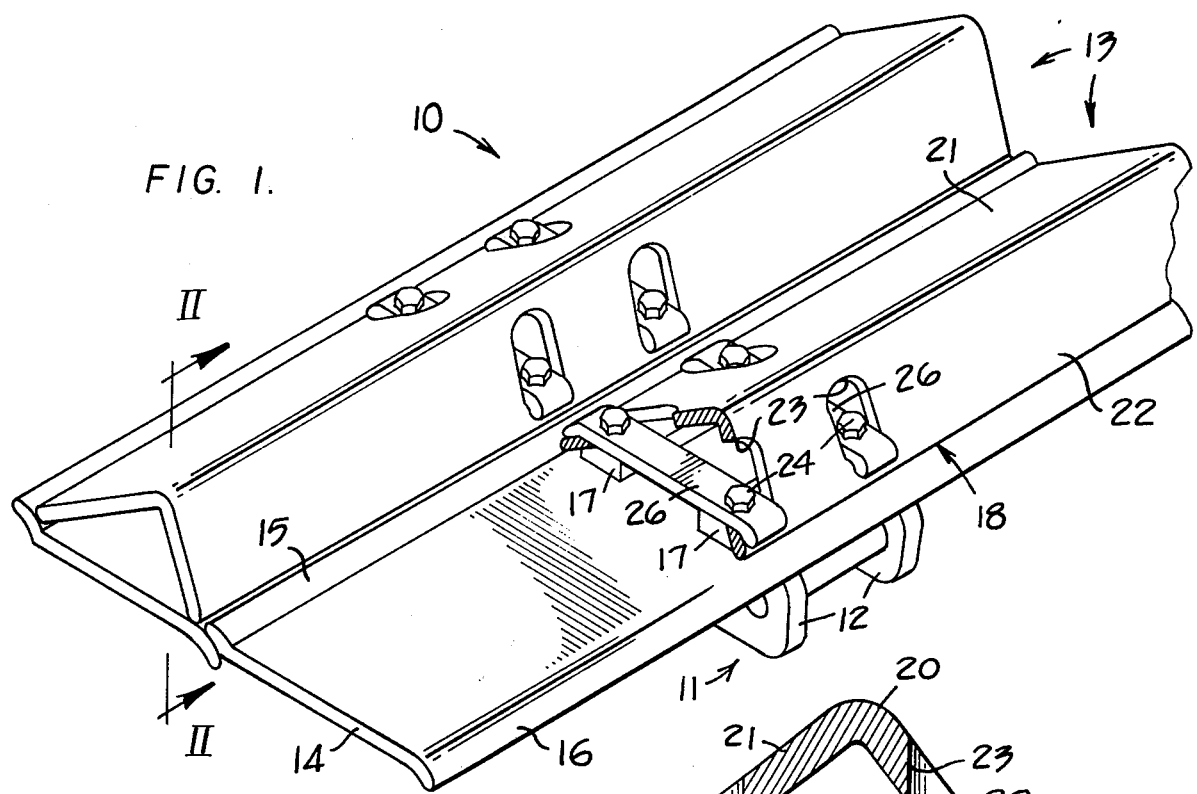

TRACK SHOE WITH CLAMPING MEANS

BACKGROUND OF THE INVENTION

Track-type vehicles, such as tractors, must oftentimes traverse "soft" soils, which gives rise to flotation and traction problems. In order to alleviate such problems, the track shoes are oftentimes widened to thus provide substantial surface contact and low-pressure engagement with the ground. Examples of such track shoes are disclosed in U.S. Pat. Nos. 3,937,529 and 4,005,912, both assigned to the assignee of this application. The track shoes are also constructed to comprise an apex portion to aid in the tractive effort of the track shoe. It is further desirable to construct and arrange the track shoe economically with the capability of having a track plate thereof changed should it become worn or damaged.

SUMMARY OF THIS INVENTION

The present invention is directed to overcome one or more of the problems set forth above.

The improved track shoe of this invention comprises a base plate, a track plate disposed on the base plate and a clamping means disposed in straddling relationship relative to the track plate. Fastening means, such as a plurality of bolts, releasably secure the clamping means and the base plate to a link assembly of an endless track assembly. In a first embodiment of this invention, the clamping means comprises at least one flat clamping plate mounted on spacer blocks, disposed between the clamping plate and the base. In a second embodiment, the clamping plate is mounted directly on the base plate.

BRIEF DESCRIPTION OF THE DRAWINGS

Other objects of this invention will become apparent from the following description and accompanying drawings wherein:

FIG. 1 partially illustrates an endless track assembly comprising a plurality of track shoes of this invention pivotally interconnected by a link assembly;

FIG. 2 is a transverse sectional view of a track shoe and a link of the link assembly, taken in the direction of arrows II—II in FIG. 1; and FIG. 3 is a view similar to FIG. 2, but illustrating a modification of the track shoe.

DETAILED DESCRIPTION

FIG. 1 partially illustrates an endless track assembly 10 comprising an articulated link assembly 11 having a plurality of links 12, each secured to a respective track shoe 13. As more clearly shown in FIG. 2, each track shoe comprises a base plate 14 having lugs 15 and 16 formed integrally on opposite sides and extending the full width thereof. The lugs of each adjacent pair of track shoes function in a conventional manner to continuously overlap each other during operation of the track assembly.

A pair of laterally spaced spacer blocks 17 are mounted on base plate 14, along with a track plate 18. The track plate has an inverted V-shape and a chamfered bearing surface 19 is formed on each spacer block 17 to engage an interior surface of the track plate. Track plate 18 has an apex portion 20 and a pair of sidewall portions 21 and 22 extending in diverging relationship relative to each other from the apex portion.

Each sidewall has a pair of access openings 23 formed therethrough to each expose the head of a bolt 24 comprising a fastening means along with a nut 25 threadably mounted on an end thereof. Each bolt extends sequentially through aligned bores formed through one of a pair of clamping plates 26, disposed in straddling relationship through openings 23 and relative to track plate 18, and through a spacer block 17 and base plate 14. Each clamping plate is substantially flat and comprises bent end or clamping portions 27 and 28, each of which project downwardly towards base plate 14 to engage an outer surface of a sidewall of track plate 18 in retaining relationship therewith.

FIG. 3 illustrates a modified track shoe 13a wherein identical numerals depict corresponding constructions, but with numerals depicted modified constructions being accompanied by an "a".

Track shoe 13a essentially differs from the FIGS. 1 and 2 track shoe in that spacer blocks 17 have been eliminated and a main body portion of a clamping plate 26a engages base plate 14 directly in bearing contact therewith. End or clamping portions 27a and 28a of the clamping plate are generally U-shaped to engage track plate 18 to retain it in secured position on link 12.

In each of the above-described embodiments, bolts 24 could be utilized to secure each clamping plate to the base plate directly. In such an application, the clamping plates and openings 23 therefor could be disposed outboard of links 12. In addition, separate bolts would be required to secure the base plate to the links directly.

The embodiments of the invention in which an exclusive property or privilege is claimed are defined as follows:

1. An endless track assembly for a track-type vehicle comprising
    an articulated link assembly including a plurality of pivotally interconnected links,
    a track shoe releasably connected to each pair of laterally spaced links of said link assembly comprising
    a base plate disposed on each said pair of said links,
    a track plate disposed on said base plate and comprising an apex portion and a pair of sidewalls disposed in diverging relationship relative to each other and extending away from said apex portion and towards said base plate,
    clamping means straddling said track plate for clamping said track plate to said base plate, and
    fastening means releasably securing said clamping means, said base plate and each of said pair of links together for releasably securing said track shoe to said link assembly.

2. The endless track assembly of claim 1 further comprising a lug disposed on each lateral side of said base plate to extend at least substantially the full width thereof.

3. The endless track assembly of claim 1 wherein said fastening means comprises a plurality of bolts at least some of which extend through said clamping means, said base plate and each of said pair of links.

4. The endless track assembly of claim 1 further comprising means defining an access opening through each sidewall of said track plate exposing each said fastening means.

5. The endless track assembly of claim 4 wherein said clamping means comprises at least one clamping plate extending transversely across said track plate and through the access openings formed through the sidewalls thereof.

6. The endless track assembly of claim 5 wherein said clamping plate comprises a bent end portion formed on each end thereof engaging an outer surface of a respective sidewall of said track plate.

7. The endless track assembly of claim 1 further comprising spacer block means disposed between said base plate and said clamping means for spacing said base plate and said clamping means relative to each other.

8. The endless track assembly of claim 7 wherein said spacer block means comprises a pair of laterally spaced spacer blocks mounted on said base plate and wherein a said fastening means extends through each of said spacer blocks.

9. The endless track assembly of claim 1 wherein said clamping means engages said base plate directly in bearing contact therewith.

10. The endless track assembly of claim 9 wherein said clamping means comprises at least one clamping plate having a generally U-shaped clamping portion formed on each end thereof and engaging said track plate.

11. A track shoe adapted for use in an endless track assembly of a track-type vehicle comprising
a base plate,
a track plate disposed on said base plate and comprising an apex portion and a pair of sidewalls disposed in diverging relationship relative to each other and extending away from said apex portion and towards said base plate, and
clamping means straddling said track plate and adapted to secure said base plate and said track plate on a link assembly of an endless track assembly.

12. The track shoe of claim 11 further comprising means defining aligned bores sequentially through said clamping means and said base plate adapted to receive a bolt therethrough for securing said track shoe to an endless track assembly.

13. The track shoe of claim 11 further comprising a bolt extending through said aligned bores.

14. The track shoe of claim 11 further comprising a lug disposed on each lateral side of said base plate to extend at least substantially the full width thereof.

15. The track shoe of claim 11 further comprising means defining at least one access opening through each sidewall of said track plate.

16. The track shoe of claim 15 wherein said clamping means comprises at least one clamping plate extending transversely across said track plate and through the access openings formed through the sidewalls thereof.

17. The track shoe of claim 16 wherein said clamping plate comprises a bent end portion formed on each end thereof engaging an outer surface of a respective sidewall of said track plate.

18. The track shoe of claim 11 further comprising spacer block means disposed between said base plate and said clamping means.

19. The track shoe of claim 18 wherein said spacer block means comprises a pair of laterally spaced spacer blocks mounted on said base plate and engaging said track plate in bearing contact therewith.

20. The track shoe of claim 11 wherein said clamping means engages said base plate directly in bearing contact therewith.

21. The track shoe of claim 20 wherein said clamping means comprises at least one clamping plate having a generally U-shaped clamping portion formed on each end thereof and engaging said track plate.

22. An endless track assembly for a track-type vehicle comprising
an articulated link assembly including a plurality of pivotally interconnected links,
a track shoe releasably connected to each pair of laterally spaced links of said link assembly comprising
a base plate disposed on each said pair of said links,
a track plate disposed on said base plate,
clamping means straddling said track plate for clamping said track plate to said base plate,
fastening means releasably securing said clamping means, said base plate and each of said pair of links together for releasably securing said track shoe to said link assembly, and
spacer block means disposed between said base plate and said clamping means for spacing said base plate and said clamping means relative to each other.

23. An endless track assembly for a track-type vehicle comprising
an articulated link assembly including a plurality of pivotally interconnected links,
a track shoe releasably connected to each pair of laterally spaced links of said link assembly comprising
a base plate disposed on each said pair of said links,
a track plate disposed on said base plate,
clamping means straddling said track plate for clamping said track plate to said base plate and engaging said base plate directly in bearing contact therewith, and
fastening means releasably securing said clamping means, said base plate and each of said pair of links together for releasably securing said track shoe to said link assembly.

24. A track shoe adapted for use in an endless track assembly of a track-type vehicle comprising
a base plate,
a track plate disposed on said base plate, and
clamping means straddling said track plate for clamping said base plate and said track plate together and adapted to secure said base plate and said track plate on a link assembly of an endless track assembly, and
spacer block means disposed between said base plate and said clamping means for spacing said base plate and said clamping means relative to each other.

25. A track shoe adapted for use in an endless track assembly of a track-type vehicle comprising
a base plate,
a track plate disposed on said base plate, and
clamping means straddling said track plate for clamping said track plate to said base plate and engaging said base plate directly in bearing contact therewith and adapted to secure said base plate and said track plate on a link assembly of an endless track assembly.

* * * * *